US011186176B2

(12) United States Patent
Erkocak

(10) Patent No.: US 11,186,176 B2
(45) Date of Patent: Nov. 30, 2021

(54) MULTIFUNCTIONAL SWITCH DEVICE

(71) Applicant: MAKERSAN MAKINA OTOMOTIV SANAYI TICARET ANONIM SIRKETI, Kocaeli (TR)

(72) Inventor: Levent Erkocak, Kocaeli (TR)

(73) Assignee: MAKERSAN MAKINA OTOMOTIV SANAYI TICARET ANONIM SIRKETI, Kocaeli (TR)

(*) Notice: Subject to any disclaimer, the term of this patent is extended or adjusted under 35 U.S.C. 154(b) by 0 days.

(21) Appl. No.: 16/969,834

(22) PCT Filed: Feb. 15, 2018

(86) PCT No.: PCT/TR2018/050057
§ 371 (c)(1),
(2) Date: Aug. 13, 2020

(87) PCT Pub. No.: WO2019/160513
PCT Pub. Date: Aug. 22, 2019

(65) Prior Publication Data
US 2020/0369154 A1 Nov. 26, 2020

(51) Int. Cl.
*B60K 37/06* (2006.01)
*B60Q 3/10* (2017.01)
(Continued)

(52) U.S. Cl.
CPC .............. *B60K 37/06* (2013.01); *B60K 35/00* (2013.01); *B60Q 3/10* (2017.02); *G06F 3/04886* (2013.01); *B60K 2370/143* (2019.05)

(58) Field of Classification Search
CPC .......... B60K 37/06; B60K 35/00; B60Q 3/10; G06F 3/04886
See application file for complete search history.

(56) References Cited

U.S. PATENT DOCUMENTS 9,718,405 B1 * 8/2017 Englander ............... B60R 1/008
2015/0268788 A1 * 9/2015 Erdogan ............... G06F 1/1656
345/173

(Continued)

FOREIGN PATENT DOCUMENTS

DE 102006016092 A1 10/2007
DE 102010010574 A1 9/2011
(Continued)

*Primary Examiner* — David E Choi
(74) *Attorney, Agent, or Firm* — Bayramoglu Law Offices LLC

(57) ABSTRACT

A multifunctional switch device for operating a plurality of vehicle functions and services including an adjustment member which is a rotary-push-pull actuator; and an upper casing and a lower casing that together enclose a stationary inner body; an inner cover rotatable based on the rotation of the adjustment member; a pin; an electronic card; and an upper dome positioned on an upper surface of the electronic card. The multifunctional switch device further includes a lower dome positioned on a lower surface of the electronic card to generate an actuating signal for performing an assigned function. When the adjustment member and thus the pin are pulled in upwards direction, through the +y direction of the multifunctional switch device, the lower dome is also pulled up and come into contact with the lower surface of the electronic card under an action of an applied pulling force.

20 Claims, 4 Drawing Sheets

FIG. 1

(51) Int. Cl.
*B60K 35/00* (2006.01)
*G06F 3/0488* (2013.01)

(56) References Cited

U.S. PATENT DOCUMENTS

| | | |
|---|---|---|
| 2017/0144546 A1 | 5/2017 | Bouaziz |
| 2018/0329622 A1* | 11/2018 | Missig .................. G06F 3/0219 |
| 2019/0281340 A1* | 9/2019 | Sacra ...................... B60K 35/00 |
| 2020/0249835 A1* | 8/2020 | Ueno .................... G06F 1/3206 |
| 2020/0369154 A1* | 11/2020 | Erkocak .............. G06F 3/04886 |

FOREIGN PATENT DOCUMENTS

| | | |
|---|---|---|
| JP | 2001118468 A | 4/2001 |
| JP | 2007073265 A | 3/2007 |

* cited by examiner

MULTIFUNCTIONAL SWITCH DEVICE

CROSS-REFERENCE TO THE RELATED APPLICATIONS

This application is the national stage entry of International Application No. PCT/TR2018/050057, filed on Feb. 15, 2018, the entire contents of which are incorporated herein by reference.

TECHNICAL FIELD

The present invention relates to a multifunctional switch device for controlling various functions in an automobile.

BACKGROUND

In automotive industry, a variety of input control systems are developed for controlling audio, telematics and telecommunication functions of vehicles which have many buttons, switches, sliders and knobs all around the driver. A solution for simplifying these complex systems is found as using integrated controllers with which the driver can navigate through a menu on a flat display screen. Also some integrated controllers are designed to be one single interface for many functions and features of the vehicle consists of a LCD panel mounted in the dashboard and a controller knob mounted on the center console, as replacing the array of controls with an all-in-one unit by using a controller knob's rotate-and-press mechanism. In addition, such controllers often include hot keys for immediate access to certain functions. Furthermore, some controllers were designed to use touch-operated technology in vehicle input options, i.e., by entering letters or numbers by handwriting.

US 2017144546 A1 discloses an operating device for a motor vehicle, comprising a rotary actuator with an operating knob which is rotatable about a rotational axis. The rotary actuator may be part of a rotary/push actuator, which generates an actuating signal during rotation of the operating knob and is translationally deflectable transversely with respect to the rotational axis for alternately operating two control modules using the same operating device.

DE 102006016092 A1 proposes an operating device for a motor vehicle, wherein the operating device is provided for setting a plurality of setting functions of a vehicle component or for selecting selection options which are shown on a display device. Said operating device has an operating surface and said operating surface is configured to be capable of being distinguished haptically in each case for the different setting functions of the vehicle component or the different selection options.

DE 102010010574 A1 discloses a device that has a contact-sensitive surface area for capacitive detection of a contact of an article with the surface area or an approximation of the article to the surface. An adjustment element is arranged on the surface area, and comprises an electrical conductive grip surface and another surface opposite to the surface area. The latter surface comprises an electrical conductive surface, which is electrically connected with the grip surface, and the adjustment element has a rotary switch with a rotation axis.

When the present input control systems are investigated, the complexity of said systems used in the automotive industry is obvious which comprise many buttons switches, sliders and knobs (i.e. back, menu, options, etc.) all around the driver and thus requires a high level of attention of the driver. Accordingly, it is apparent that a simplified controlling system is a need for a developed technology for controlling as many vehicle functions as possible with a multifunctional switch device. In that way, the driver can navigate said functions through a multifunctional switch device which advantageously enables the intuitive operation of the driver.

SUMMARY

Primary object of the present invention is to provide a multifunctional switch device for a vehicle, which is used to control various functions, which has a space-saving integration and also allows easy and intuitive operation.

Another object of the present invention is to provide a multifunctional switch device comprising a push & pull switch and noncontact endless bidirectional rotary encoder.

Another object of the present invention is to provide a switch device that allows reliable detection of user input and avoids unwanted operating errors.

Another object of the present invention is to provide a switch device for controlling a screen display, in such a way that fast operation is possible even in the main menus.

A further object of present invention is to provide a multifunctional switch device which is optimal for an ergonomic aspect and which can be operated without need of direct attention.

The present invention proposes a multifunctional switch device for operating a plurality of vehicle functions and services. Said multifunctional switch device comprises an adjustment member which is a rotary-push-pull actuator; and an upper casing and a lower casing that together enclose a stationary inner body; an inner cover rotatable based on the rotation of the adjustment member; a pin; an electronic card; and an upper dome positioned on an upper surface of the electronic card. Said multifunctional switch device further comprises a lower dome positioned on a lower surface of the electronic card to generate an actuating signal for performing an assigned function. When the adjustment member and thus the pin are pulled in upwards direction, through (+y) direction of the multifunctional switch device (1), said lower dome is also pulled up and come into contact with the lower surface of the electronic card under the action of the applied pulling force.

BRIEF DESCRIPTION OF THE DRAWINGS

The figures, whose brief explanations are herewith provided, are solely intended for providing a better understanding of the present invention and are as such not intended to define the scope of protection or the context in which said scope is to be interpreted in the absence of the description.

DETAILED DESCRIPTION OF THE EMBODIMENTS

Figure 1:
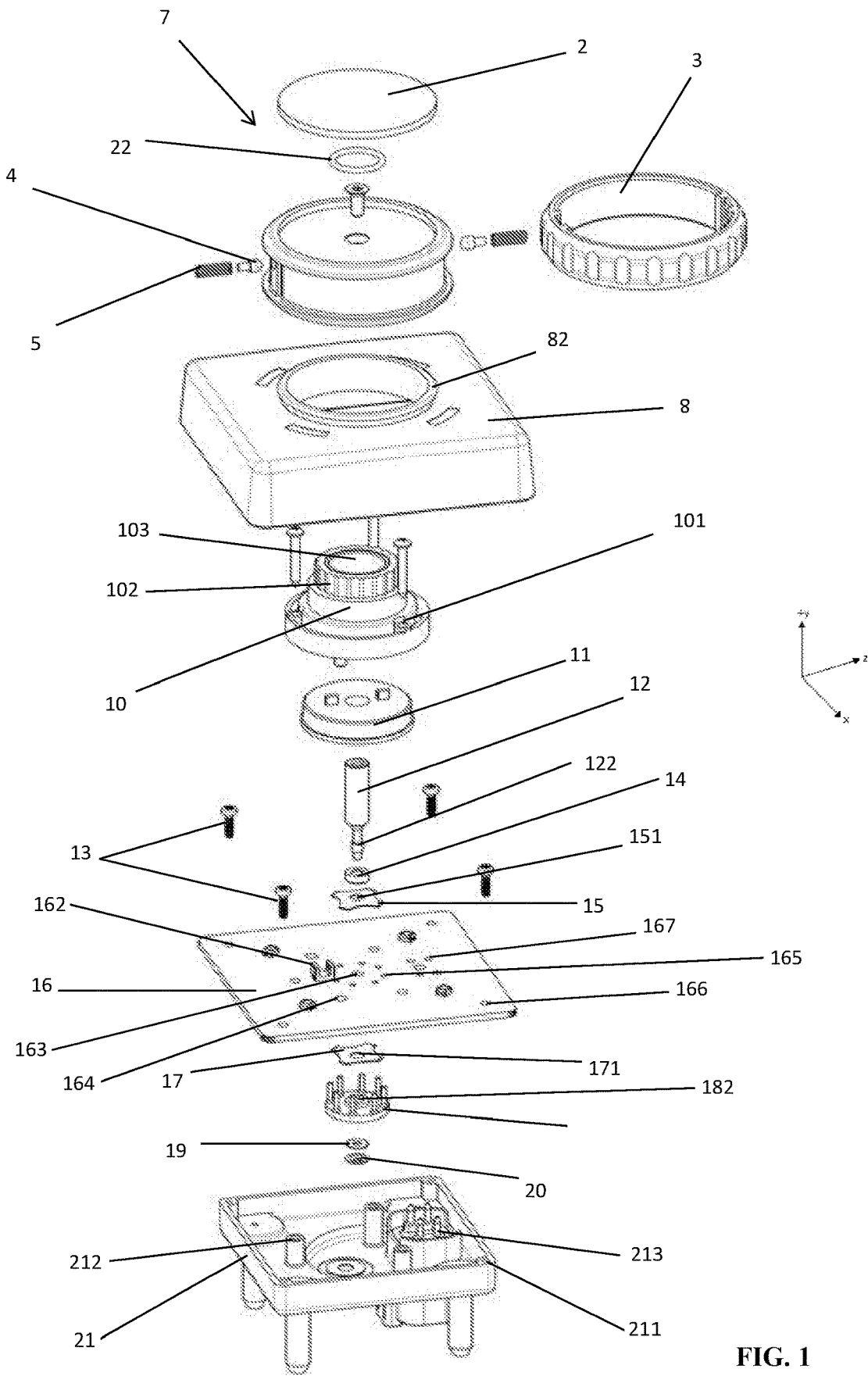
FIG. 1 shows an exploded view of the multifunctional switch device according to the present invention.

FIG. 1 shows an exploded view of a multifunctional switch device (1) which operates a plurality of vehicle functions and services, i.e. vehicle multimedia system, according to the present invention.

A vehicle multimedia system may employ a hierarchically structured menu system. Desired services and functions may be selected and activated by using the menu system and the menu system may be navigated from a hierarchically higher menu which includes a plurality of menu items, to a hierarchically lower menu, i.e., submenu. Upon activation of menu items, users may automatically reach a next menu or perform functions assigned to the activated menu items.

In order to alternately operate/control functions and services of the vehicle multimedia system such as audio services, video services, and navigation services, the multifunctional switch device (1) comprises an adjustment member (7) that allows the user to generate an actuating signal. The described adjustment member (7) according to the present invention can be rotated in clockwise or counter-clockwise direction to scroll through menu items, can also be pushed to activate the selected submenu item and pulled to switch to a higher menu.

Referring now to x, y, z coordinate diagram of FIG. 1, the term "below" or "lower" given in this specification means (−y) direction of a determined element and the term "upper" given in this specification means (+y) direction of a determined element of the present invention.

In an embodiment, the multifunctional switch device (1) is also in electronic communication with a display device, which allows users to watch the retrieved menu or menu item displayed. The display device may be a screen or a head-up display, and on the other hand may be a dot matrix display, a liquid crystal display, a touch-panel display, etc. The display device may be designed to display an operating menu, a higher menu and/or submenu which can be selected by using said adjustment member (7).

According to the present invention a multifunctional switch device (1) for operating a plurality of vehicle functions and services comprises an adjustment member (7) which is a rotary-push-pull actuator; an upper casing (8) and a lower casing (21) that together enclose a stationary inner body (10); an inner cover (11) rotatable based on the rotation of the adjustment member (7); a pin (12) that is guided by a rotation housing (71) of the adjustment member (7), a rotation housing of the inner body (103) and a rotation hole (113) of the inner cover (11); an electronic card (16); an upper dome (15) positioned on an upper surface (+y direction) of the electronic card (16) and a lower dome (17) positioned on a lower surface (−y direction) of the electronic card (16).

According to an embodiment of the present invention, the adjustment member (7) may comprise an outer ring (3), which is made of an elastic material and optionally has at least one recess on its outer surface for easy clutching and rotating. Also said adjustment member (7) may comprise a cap (2) optionally with a decorative surface for covering top portion of said adjustment member (7). Also a round ended pin (4) is placed into a lateral hole (73) of the adjustment member (7) together with an elastic element (5), for instance a spring, and the opening of the lateral hole (73) is closed by the outer ring (3) such that the elastic element (5) is located in the lateral hole (73) in a loaded state. Optionally, there may be a plurality of lateral holes (73) and elastic element (5)-round ended pin (4) assemblies.

Figure 3:
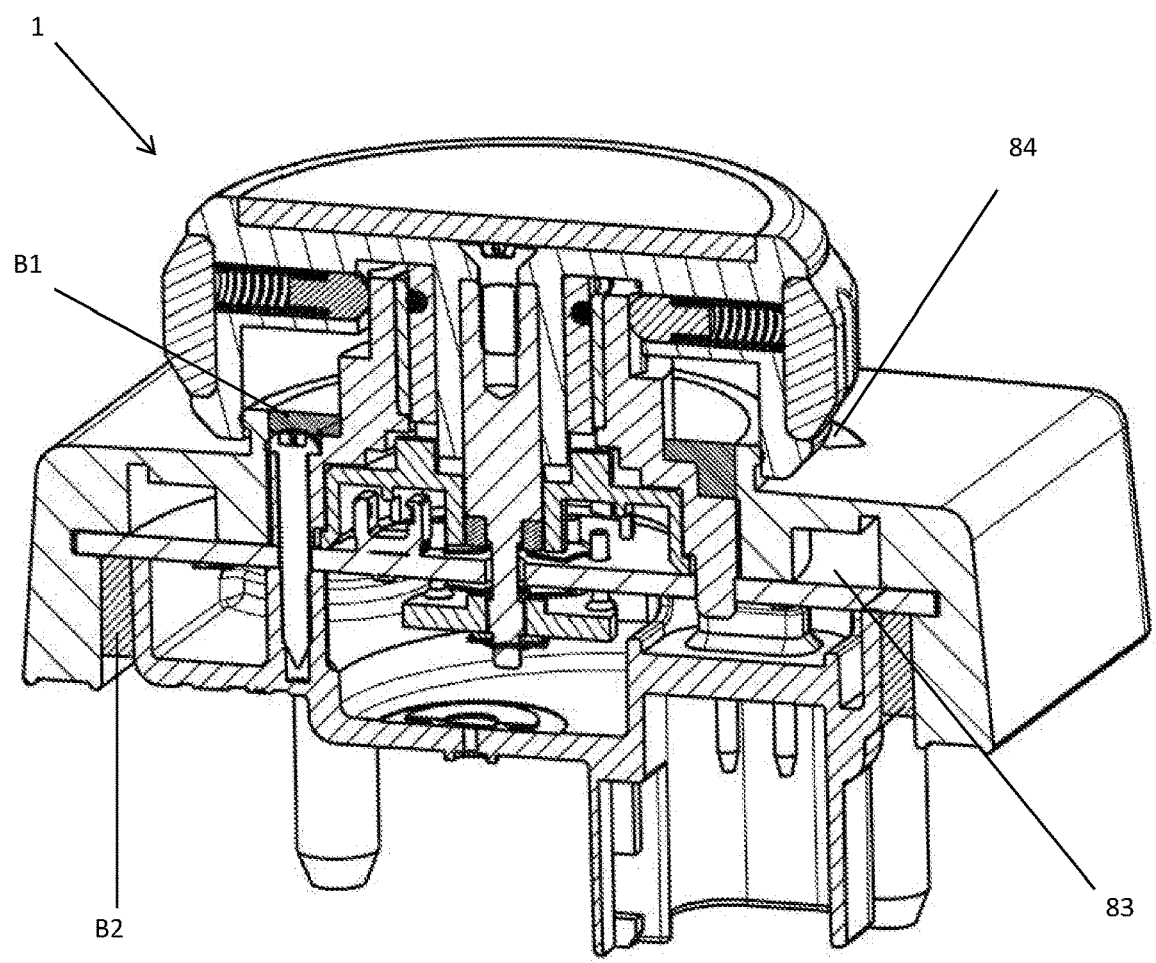
FIG. 3 shows a longitudinal cross-section view of the multifunctional switch device according to the present invention.

As shown in FIG. 3, the inner body (10) is positioned over the electronic card (16) (i.e. +y direction) by passing its positioning protrusions (104) through the centering holes (164) of the electronic card (16). Also said inner body (10) is fixed to the lower casing (21) by inserting a plurality of fixing means (9), optionally screws, both into fixing slots (101) of the inner body (10) and fixing sockets (212) of the lower casing (21). In this way the inner body (10) is become a stationary part. On the other hand, said inner body (10) has a staging unit (102) comprising a plurality of protrusions and recesses where the round ended pins (4) of the adjustment member (7) fit into the corresponding recesses of the staging unit (102). Accordingly, when the adjustment member (7) is rotated in clockwise or counter-clockwise direction, the round ended pin (4) is pushed into the lateral hole (73) by compressing on the elastic element (5) because of the height of the protrusion of the staging unit (102) and then the compressed elastic element (5) pushes the round ended pin (4) towards the corresponding recess of the staging unit (102). This movement of the round ended pin (4) can be felt by the user haptically and thus the user can perceive the switching quantity of the adjustment member (7) without directly looking to said adjustment member (7) or optionally to the display device.

Figure 2:
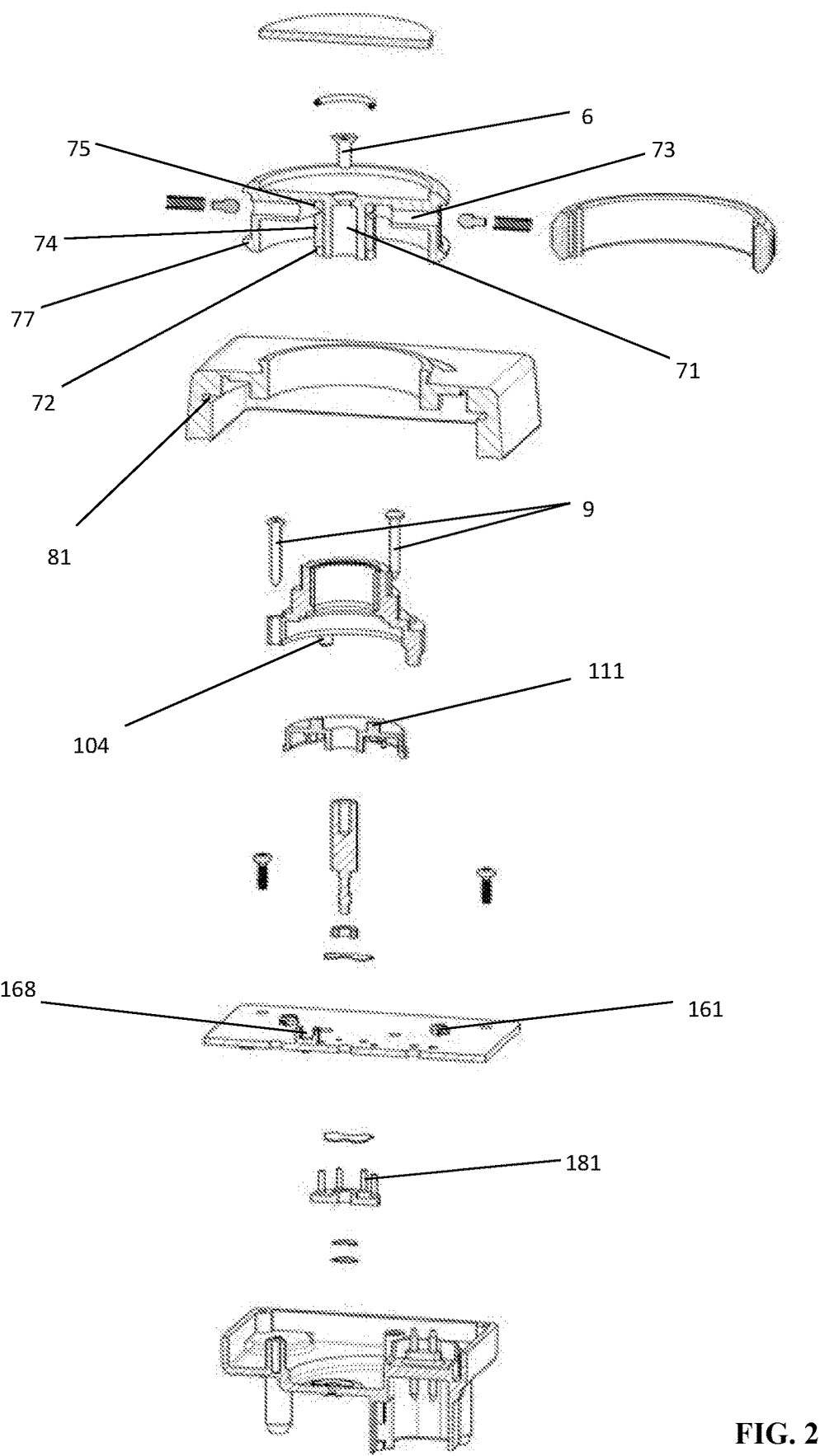
FIG. 2 shows a longitudinal cross-section view of the multifunctional switch device shown in FIG. 1.

The adjustment member (7) comprises the rotation housing (71) which guides the pin (12) as disclosed above. Said the rotation housing (71) is optionally in the form of a cylinder and a rotation surface (74) is wounded over said rotation housing (71). As shown on FIG. 2, the described rotation surface (74) comprises a positioning recess (72) at a lower end (−y direction) thereof. The inner cover (11), which is located into a lower cavity of the inner body (10), comprises a plurality of positioning ears (111) which are aligned with the positioning recess (72) of the rotation surface (74). Accordingly, the inner cover (11) may be rotated based on the rotation of the adjustment member (7), in other words the positioning recess (72) of the rotation surface (74) is an integrated part of the adjustment member (7) and the rotation of the positioning recess (72) forces the respective positioning ear (111) of the inner cover (11) to rotate.

Figure 4:
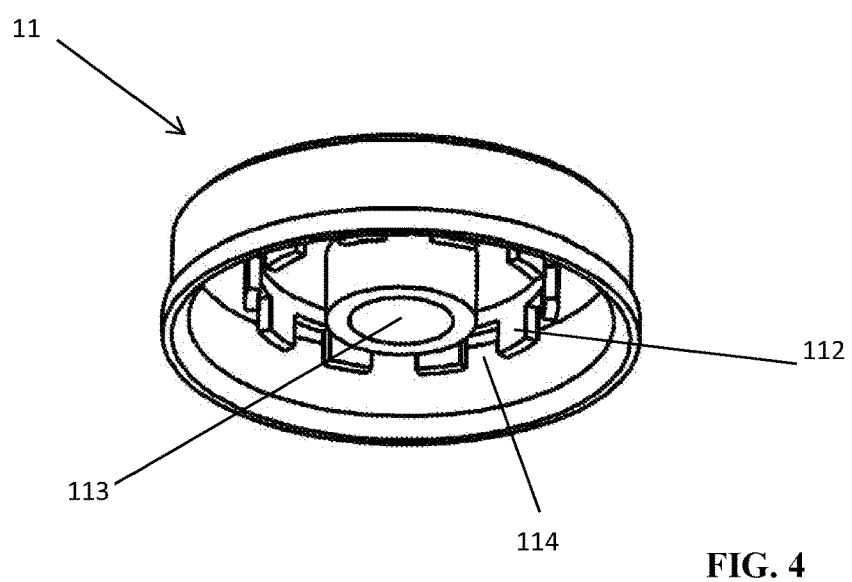
FIG. 4 shows perspective view of an inner cover of the multifunctional switch device according to the present invention.
Figure 5:
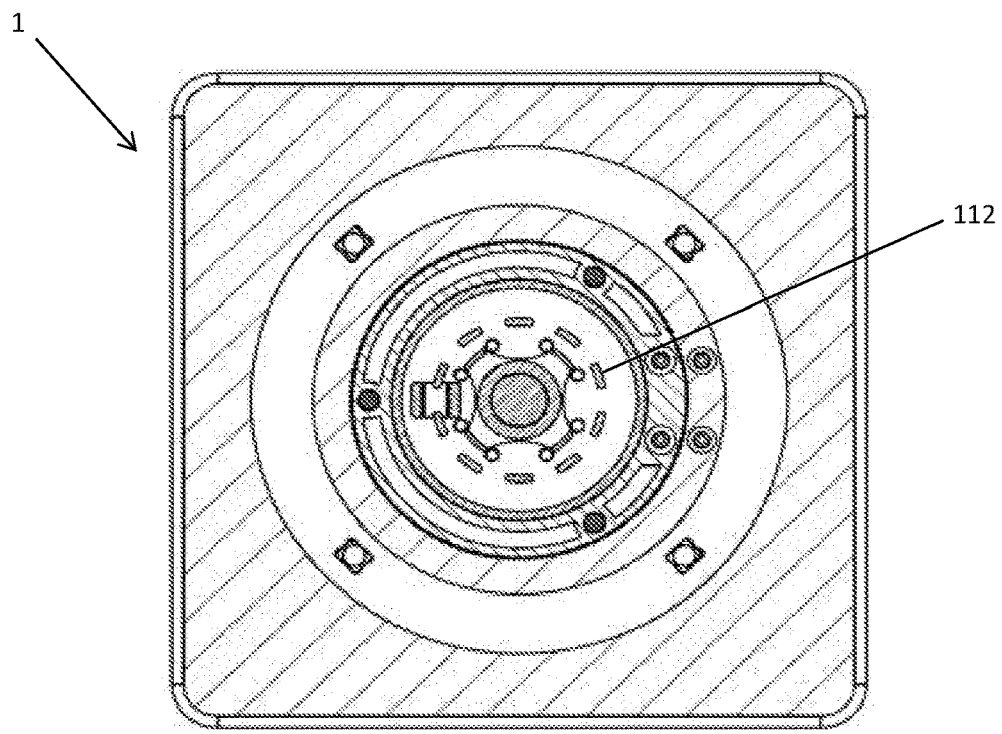
FIG. 5 shows bottom view of the multifunctional switch device comprising inner cover with 10 fins according to an embodiment of the present invention.
Figure 6:
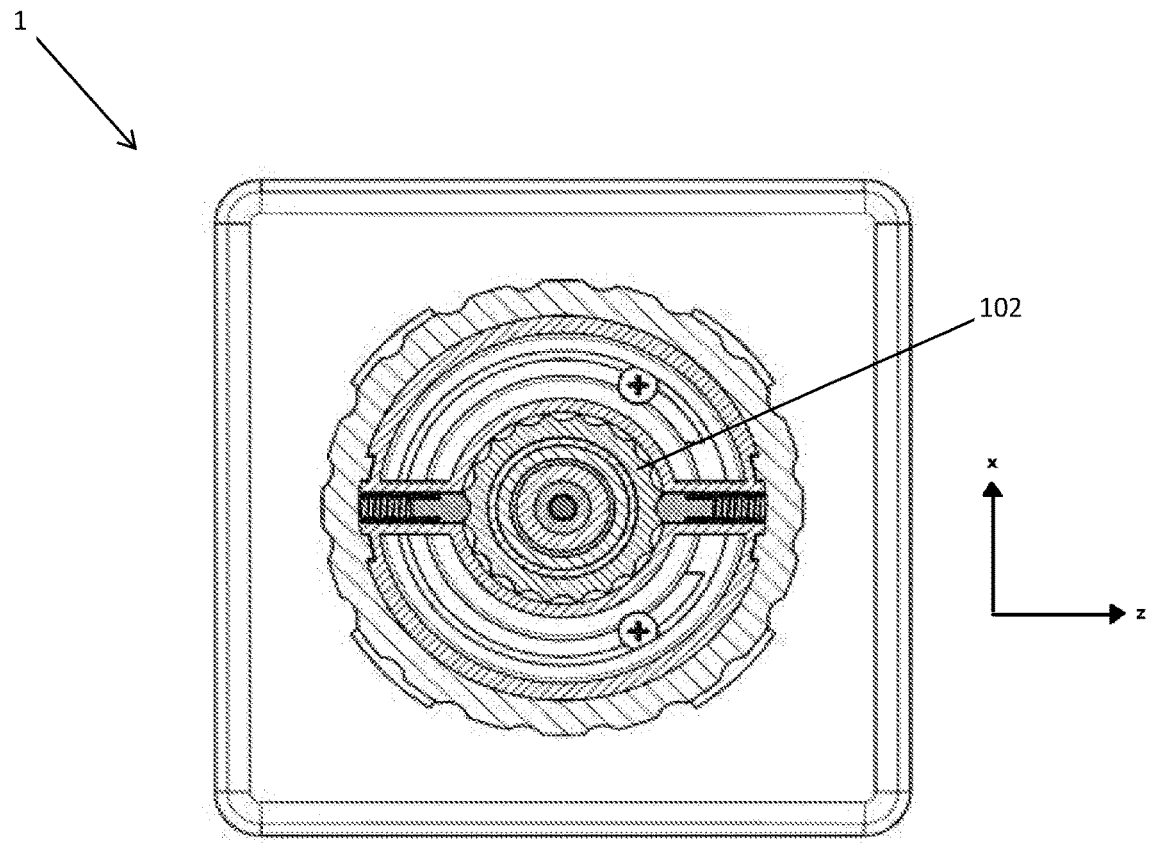
FIG. 6 shows bottom view of the multifunctional switch device comprising staging unit with 20 protrusions according to an embodiment of the present invention.

As shown in FIG. 4, the inner cover (11) comprises a plurality of fins (112) and fin gaps (114) integrated on a bottom (−y direction) surface of the inner cover (11) which is adjacent to the electronic card (16). Said fins (112) and fin gaps (114) are also rotated through the rotation hole (113) based on the rotation of the adjustment member (7). The number of the protrusions or recesses is twice the number of the fins (112) or fin gaps (114). Thus, each rotation stage respectively coincides the fins (112) and fin gaps (114) of the inner cover (11) with an optical sensor housing (168) of the optical sensor (162), which is positioned on an upper (+y direction) surface of the electronic card (16). When the fin (112) is entered within the optical sensor housing (168), the circuit is switched off and when the fin gap (114) is coincided with the optical sensor housing (168), the circuit is switched on. Thus, by means of the above disclosed adjustment member (7), the endless and contactless encoder output is provided to the user in both directions.

As shown in FIGS. 1 and 3, the pin (12) is fastened to the adjustment member (7) through a fastening means (6), for instance a screw, and guided by the rotation housing (71) of the adjustment member (7), the rotation housing (103) of the inner body (10) and the rotation hole (113) of the inner cover (11). One end of said pin (12) comprises a protrusion part (122) that extends towards the lower casing (21) of multifunctional switch device (1).

As disclosed above, the multifunctional switch device (1) according to the present invention comprises the adjustment member (7) which functions as a rotary actuator. At the same time, said adjustment member (7) is a push & pull button actuator with double domes. Here the component called as "dome" is a contact member in the form of a spherical cap having a continuous or practically continuous circular periphery and exerts a reaction force to a pressure applied on it. Additionally, metal domes constitute particularly advantageous elements as they provide a tactile effect to the user. The adjustment member (7) comprises an upper dome (15) to generate an actuating signal for performing an assigned function (for example; activating a selected submenu item) when said adjustment member (7) is pushed through (−y) direction of the multifunctional switch device (1), and also comprises a lower dome (17), preferably a dome made of metal, to generate an actuating signal for performing another assigned function (for example; activating a higher menu item, i.e. the assigned function is "back" or activating "options menu") when said adjustment member (7) is pulled through (+y) direction of the multifunctional switch device (1).

In order to generate the actuating signals by pulling or pushing the adjustment member (7), the protrusion part (122) of the pin (12) extends respectively through a bushing (14), through an inner housing (151) of an upper dome (15), through a pin bore (163) of the electronic card (16) and through an inner housing (171) of a lower dome (17), then fixed to a segment (20) by passing through an inner hole (182) of a centering unit (18) and through a washer (19). Here, the upper dome (15) is positioned on an upper surface (+y direction) of the electronic card (16) which is adjacent to the inner cover (11) and the lower dome (17) is positioned on a lower surface (−y direction) of the electronic card (16). Also the centering unit (18) includes centering pins (181) that pass through centering holes (165) of the electronic card (16) and that clutch the upper and lower domes (15 and 17) so as to prevent rotation of the same (15 and 17). Accordingly, when the adjustment member (7) is pushed through (−y) direction of the multifunctional switch device (1), the pin (12) which is fastened to the adjustment member (7) is also pushed down towards the lower casing (21) together with the bushing (14) attached onto the protrusion part (122) of the pin (12). Thus, the bushing (14) transmits the repelling force onto the upper dome (15) and the upper dome (15) comes into contact with the upper surface of the electronic card (16) under the action of the pressure, and then when the adjustment member (7) together with the pin (12) is released, the upper dome (15) returns to its original position because of its elastic structure and thus the contact between the upper dome (15) and the electronic card (16) is interrupted. On the other hand, when the adjustment member (7) is pulled through (+y) direction of the multifunctional switch device (1), the pin (12) and the segment (20) fixed thereto (12) are also pulled upwards (through (+y) direction) together with the washer (19) and the centering unit (18). Thereby, the lower dome (17) comes into contact with the lower surface of the electronic card (16) under the action of a pressure and when the pin (12) is released, the lower dome (17), together with the pin (12), the segment (20), the washer (19) and the centering unit (18), return to its original position because of the elastic structure of the dome (17) and thus the contact between the lower dome (17) and the electronic card (16) is interrupted. As a consequence, the user, that exerts repelling force onto the adjustment member (7), feels the flipping of the dome (15) and therefore has a tactile sensation which indicates that the contact has actually been made. Thus by means of the above disclosed multifunctional switch device (1), a bidirectional contactless and infinite encoder output and push & pull switch control is provided and also control of a plurality of functions, especially by pushing and pulling the adjustment member (7), is ensured by using just one electronic card (16). Here the electronic card (16) is preferably a PCB (Printed Circuit Board) and as disclosed above, it is positioned into inner volume of the upper casing (8) and the lower casing (21), preferably as to be embedded into inner recesses (81) of the upper casing (8). Optionally, contact pins (213) of the lower casing (21) are passed through contact housings (167) of the electronic card (16) and welded. Also, one or more fixing means (13) is secured to fixing socket (211) of the lower casing (21) by passing through fixing socket (166) of the electronic card (16).

According to a preferred embodiment of the present invention, the electronic card (16) includes one or more lighting means (161), preferably LEDs, that's location is in alignment with location of at least one lighting means cavity (83) formed on the upper casing (8) where the upper casing (8) is manufactured from light-transmitting material, and preferably from silicone. In terms of being compatible for the overall design of the vehicle, surface of the upper casing (8) is optionally coated with black paint which does not transmit light. During the painting, predetermined parts of the upper casing (8) are not painted for obtaining one or more lighting frame (84) which allows the light of the lighting means (161) to be emitted. Thus, the light emitted from the lighting frame (84) may be used both as a night light and optionally as an encoder skip warning light. Also said lighting may be in different colors as to be allocated for different functions such as right direction encoder, left direction encoder, push/press, pull, long term press (i.e. pressing for a duration of at least a predetermined second), long term pull (i.e. pulling for a duration of at least a predetermined second), etc.

According to an embodiment of the present invention, the adjustment member (7) includes a sealing surface (77) and also the upper casing (8) includes a sealing protrusion (82). When the elements of the multifunctional switch device (1) are properly mounted on each other, upper surface of the sealing protrusion (82) comes into contact with the sealing surface (77) to ensure complete sealing amongst them. On the other hand, an o-ring (22) is positioned on an o-ring housing (75) formed on the rotation surface (74) of the adjustment member (7) for obtaining a watertight area between the rotation surface (74) of the adjustment member (7) and the inner body (10). Also, the cavities of B1 and B2, shown in FIG. 3, may be filled with liquid silicone for ensuring sealing respectively amongst the upper casing (8) and the lower casing (21) and also amongst the upper casing (8) and the inner body (10).

What is claimed is:

1. A multifunctional switch device for operating a plurality of vehicle functions and services, comprising
an adjustment member, wherein the adjustment member is a rotary-push-pull actuator;
an upper casing and a lower casing, wherein the upper casing and the lower casing enclose an inner body, an inner cover, a pin, an electronic card and an upper dome together; the inner cover is rotatable based on a rotation of the adjustment member; the pin is integrated to the adjustment member; the upper dome is positioned on an upper surface of the electronic card;

the multifunctional switch device further comprises a lower dome positioned on a lower surface of the electronic card to generate an actuating signal for performing an assigned function, and the lower dome is mounted on the pin and thus, when the adjustment member is pulled through a direction of the multifunctional switch device, the pin together with the lower dome is pulled up in the direction and the lower dome comes into contact with the lower surface of the electronic card under an action of an applied pulling force.

2. The multifunctional switch device according to claim 1, wherein the actuating signal generated by the lower dome activates a higher menu item, an "options menu" function or a "back" function.

3. The multifunctional switch device according to claim 1, further comprising a segment and/or a washer, wherein the segment and/or the washer is mounted on the pin and positioned below the lower dome in a −y direction.

4. The multifunctional switch device according to claim 3, further comprising a centering unit, wherein the centering unit is mounted on the pin and positioned below the lower dome in −y direction.

5. The multifunctional switch device according to claim 4, wherein the centering unit comprises a plurality of centering pins, wherein the plurality of centering pins pass through a plurality of centering holes of the electronic card and clutch to the upper dome and the lower dome as to prevent a rotation of the upper dome and the lower dome.

6. The multifunctional switch device according to claim 1, wherein the lower dome has an elastic structure and when a pulling force applied on the lower dome is released, the lower dome returns to an original position of the lower dome as to interrupt a contact between the lower dome and the electronic card.

7. The multifunctional switch device according to claim 1, wherein the inner cover comprises a plurality of fins and a plurality of fin gaps integrated on a bottom surface of the inner cover and the inner cover is also rotated through a rotation hole based on the rotation of the adjustment member.

8. The multifunctional switch device according to claim 7, wherein the electronic card comprises an optical sensor and an optical sensor housing, wherein the optical sensor housing coincides the plurality of fins and the plurality of fin gaps of the inner cover during a rotation of the inner cover for operating a switched on/off condition of a circuit.

9. The multifunctional switch device according to claim 1, wherein a staging unit of the inner body comprises a plurality of protrusions and recesses, and at least one round ended pin with at least one elastic element is located into a lateral hole of the adjustment member, wherein the at least one round ended pin fits into a plurality of corresponding recesses of the staging unit, and the at least one round ended pin is moved along the plurality of protrusions and recesses by causing the at least one round ended pin to be moved in or out of the lateral hole, depending on the rotation of the adjustment member.

10. The multifunctional switch device according to claim 1, wherein the adjustment member comprises a positioning recess, wherein the positioning recess applies a force onto a relevant positioning ear of the inner cover, as to rotate the inner cover based on the rotation of the adjustment member.

11. The multifunctional switch device according to claim 4, wherein the pin comprises a protrusion part, wherein the protrusion part extends respectively through a bushing, through an inner housing of the upper dome, through a pin bore of the electronic card, through an inner housing of the lower dome, and the protrusion part is fixed to the segment by passing through an inner hole of the centering unit and through the washer.

12. The multifunctional switch device according to claim 1, wherein the electronic card is a Printed Circuit Board, and is embedded to a plurality of inner recesses of the upper casing.

13. The multifunctional switch device according to claim 1, wherein the electronic card comprises one or more lighting means and at least a part of the upper casing is manufactured from a light-transmitting material as to emit a plurality of lights of the one or more lighting means.

14. The multifunctional switch device according to claim 1, wherein the multifunctional switch device is in an electronic communication with a display device, and the display device is configured to display a retrieved menu or menu item displayed.

15. A vehicle comprising a multifunctional switch device according to claim 1.

16. The multifunctional switch device according to claim 2, wherein the multifunctional switch device is in an electronic communication with a display device, and the display device is configured to display a retrieved menu or menu item.

17. The multifunctional switch device according to claim 3, wherein the multifunctional switch device is in an electronic communication with a display device, and the display device is configured to display a retrieved menu or menu item.

18. The multifunctional switch device according to claim 4, wherein the multifunctional switch device is in an electronic communication with a display device, and the display device is configured to display a retrieved menu or menu item.

19. The multifunctional switch device according to claim 5, wherein the multifunctional switch device is in an electronic communication with a display device, and the display device is configured to display a retrieved menu or menu item.

20. The multifunctional switch device according to claim 6, wherein the multifunctional switch device is in an electronic communication with a display device, and the display device is configured to display a retrieved menu or menu item.

\* \* \* \* \*